(12) United States Patent
Takagi et al.

(10) Patent No.: US 6,557,378 B2
(45) Date of Patent: May 6, 2003

(54) METHOD FOR PRESSING OXYNITRIDE GLASS, DISK OF OXYNITRIDE GLASS MADE BY SAID METHOD, AND PRESSING DIE FOR SAID METHOD

(75) Inventors: Katsutoshi Takagi, Kobe (JP); Moriyoshi Kanamaru, Kobe (JP); Kazutaka Kunii, Kobe (JP); Naoya Fujiwara, Kobe (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 242 days.

(21) Appl. No.: 09/741,799

(22) Filed: Dec. 22, 2000

(65) Prior Publication Data

US 2001/0009103 A1 Jul. 26, 2001

(30) Foreign Application Priority Data

| Dec. 24, 1999 | (JP) | ............................................. | 11-368336 |
| Dec. 24, 1999 | (JP) | ............................................. | 11-368337 |
| Feb. 17, 2000 | (JP) | ........................................ | 2000-039999 |
| Mar. 28, 2000 | (JP) | ........................................ | 2000-089670 |

(51) Int. Cl.$^7$ .......................... C03B 35/00; C03B 40/02
(52) U.S. Cl. ........................ 65/26; 65/29.15; 65/29.19; 65/162; 65/305; 65/318; 65/319
(58) Field of Search ...................... 65/26, 29.15, 29.19, 65/162, 305, 318, 319

*Primary Examiner*—Michael Colaianni
(74) *Attorney, Agent, or Firm*—Oblon, Spivak, McClelland, Maier & Neustadt, P.C.

(57) ABSTRACT

A method of producing a disk having a radius of r and a thickness of 2h from an oxynitride glass by pressing, said method being characterized in that the pressing load (F), the pressing temperature (T), and the pressing time (t) are defined by the expression below.

$$1900 \geq T \geq 100 \times \log_{10}\left(\frac{0.045 \times \pi \times r^4}{t \times h^2 \times F}\right) + A \quad (1)$$

where,

F: pressing load (N)
T: pressing temperature (° C.)
t: pressing time (s)
π: ratio of the circumference to its diameter
r: radius of disk formed by pressing (mm)
h: half a thickness of disk formed by pressing (mm)
A: constant depending on glass composition (° C.) defined by 1450° C.$\geq$A$\geq$650° C.

According to this method, it is possible to establish the optimum conditions for making disks from oxynitride glass, and it is possible to provide disks of oxynitride glass suitable for use as high-performance magnetic disk having a high specific rigidity.

7 Claims, 3 Drawing Sheets

METHOD FOR PRESSING OXYNITRIDE GLASS, DISK OF OXYNITRIDE GLASS MADE BY SAID METHOD, AND PRESSING DIE FOR SAID METHOD

BACKGROUND OF THE INVENTION

1. Field of the Invention

The present invention relates to a method of pressing a disk that can be used as the disk for recording medium such as magnetic disk, a glass suitable for said method, a method of pressing a hard disk substrate from said glass by using a press-mold, and a method of pressing a hard disk substrate from said glass by using a press-mold with a release layer.

2. Description of the Related Art

In the field of magnetic disk, technical development is being made rapidly toward increasing the recording density and transfer rate. Nowadays, it is urgent to develop a high-speed disk for rapid transfer. Hence, there is a demand for a disk material with a high specific rigidity which will not vibrate during high-speed running. Conventional aluminum disks (referred to as aluminum substrate hereinafter) have a specific rigidity of 26.7 (Young's modulus [72 GPa] divided by density [2.7 g/cm$^3$]). It is said that aluminum disks need more than twice that specific rigidity if they are to be used at high speeds of 10000 rpm. The only way to double the specific rigidity of aluminum disks is to combine aluminum with ceramics (MMC). This is not practical from the standpoint of production cost.

On the other hand, glass disks used in 2.5-inch size (referred to as glass substrate hereinafter) are attracting attention because it is easy to increase their specific rigidity. This object is achieved by heating glass at an adequate temperature, thereby causing a crystalline phase with a high Young's modulus to separate out. The resulting glass ceramic has a high Young's modulus. For example, Japanese Patent Laid-open Nos. 329440/1994, 111024/1996, and 221747/1996 disclose a process for causing lithium dioxide crystals and α-quartz crystals to separate out. And Japanese Patent Laid-open No. 77531/1998 discloses a process for causing spinel crystals to separate out, thereby increasing Young's modulus to 109–144 GPa and specific rigidity to 36–47.

The disadvantage of the disclosed technology is that crystallization increases the specific rigidity of glass but it also gives rise to a composite structure (composed of the hard crystalline phase and the soft glass phase). Such a composite structure produces minute steps at the time of polishing, making it difficult to obtain a super-mirror required of disks.

There is a way to increase the specific rigidity of glass per se by incorporation with a rare earth element which improves Young's modulus of glass. The disadvantage of this technology is that incorporation with a rare earth element increases not only Young's modulus but also specific gravity, with the result that the specific rigidity of glass does not increase as expected.

Thus, as a means to increase Young's modulus without remarkably increasing the specific gravity of glass, using an oxynitride glass, with nitrogen replaced by oxygen in glass, is being investigated. However, an oxynitride glass is high in viscosity at high temperatures, and its conversion into a disk by industrial pressing was difficult.

OBJECT AND SUMMARY OF THE INVENTION

The present inventors found an optimum pressing condition, a press-mold, and a release layer required to make the oxynitride glass into disks. Thus, it is an object of the present invention to provide an oxynitride glass disk useful as a high-performance magnetic disk having a high specific rigidity.

The gist of the present invention resides in a method of producing a disk having a radius of r and a thickness of 2h from an oxynitride glass by pressing, said method being characterized in that the pressing load (F), the pressing temperature (T), and the pressing time (t) are defined by the expression below.

$$1900 \geq T \geq 100 \times \log_{10}\left(\frac{0.045 \times \pi \times r^4}{t \times h^2 \times F}\right) + A \qquad (1)$$

where,

F: pressing load (N)
T: pressing temperature (° C.)
t: pressing time (s)
π: ratio of the circumference to its diameter
r: radius of disk formed by pressing (mm)
h: half a thickness of disk formed by pressing (mm)
A: constant depending on glass composition (° C.) defined by 1450° C.≦A≦650° C.

The present invention also covers an oxynitride glass disk produced by pressing according to the above-mentioned method. A preferred material for the disk is an oxynitride glass represented by M$^1$—Al—Si—O—N (M$^1$ denoting one or more species selected from Ca, Mg, Y, Gd, Ce, and La), an oxynitride glass represented by M$^2$—Si—O—N (M$^2$ denoting Ca and/or Mg), or an oxynitride glass composed of more than one kind thereof.

Figure 1:
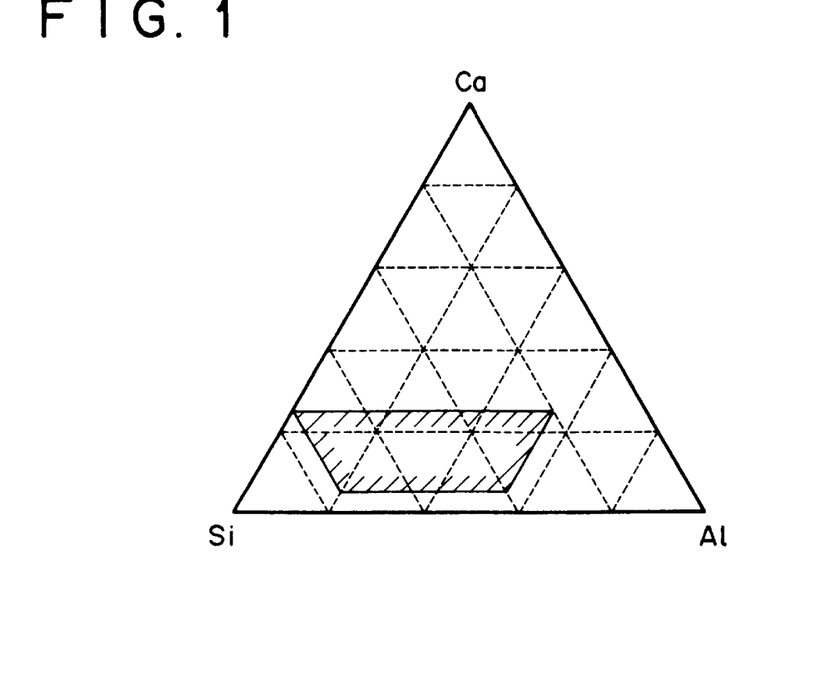
FIG. 1 is a diagram showing the desirable range of metallic components (Ca, Al, and Si) in the composition of an oxynitride glass represented by Ca—Al—Si—O—N, with the content of N defined by 5 eq %≦N≦30 eq %.
Figure 2:
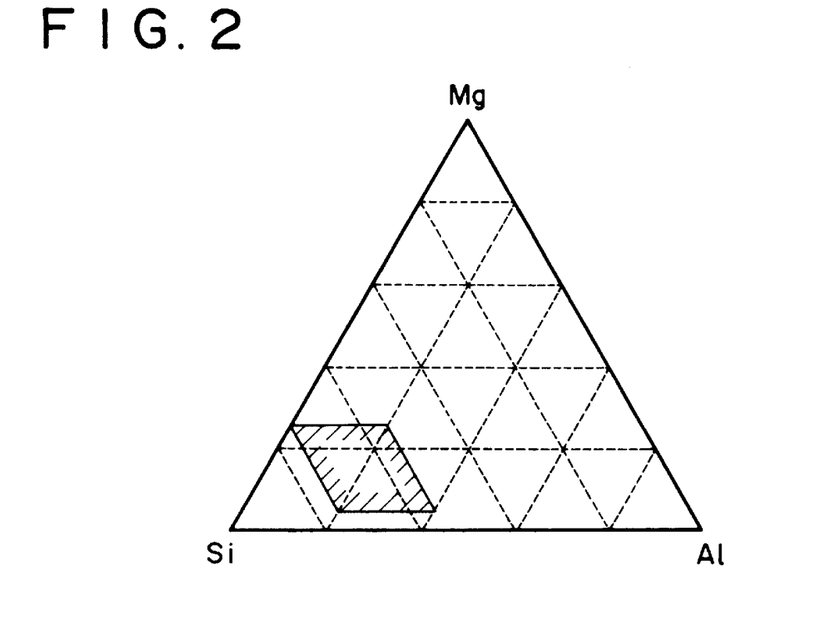
FIG. 2 is a diagram showing the desirable range of metallic components (Mg, Al, and Si) in the composition of an oxynitride glass represented by Mg—Al—Si—O—N, with the content of N defined by 5 eq %≦N≦30 eq %.
Figure 3:
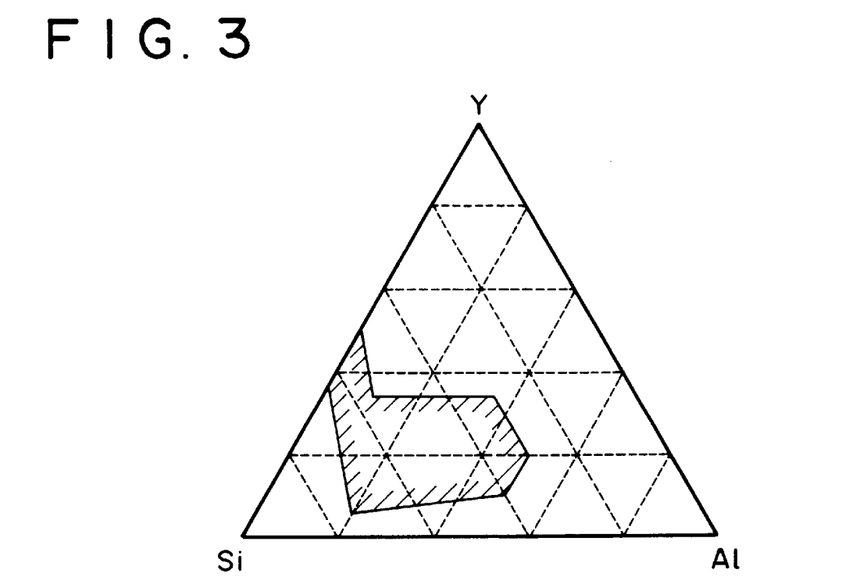
FIG. 3 is a diagram showing the desirable range of metallic components (Y, Al, and Si) in the composition of an oxynitride glass represented by Y—Al—Si—O—N, with the content of N defined by 5 eq %≦N≦30 eq %.
Figure 4:
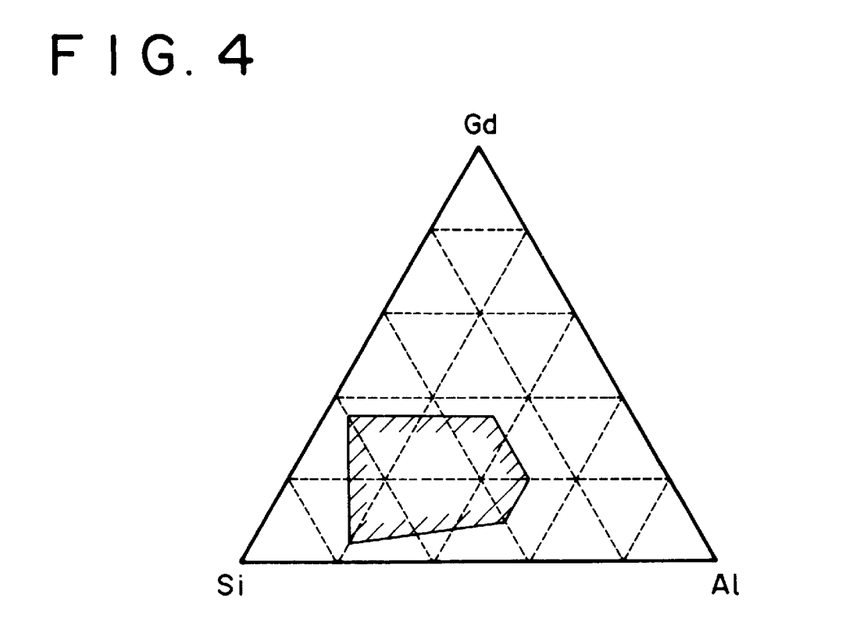
FIG. 4 is a diagram showing the desirable range of metallic components (Gd, Al, and Si) in the composition of an oxynitride glass represented by Gd—Al—Si—O—N, with the content of N defined by 5 eq %≦N≦30 eq %.
Figure 5:
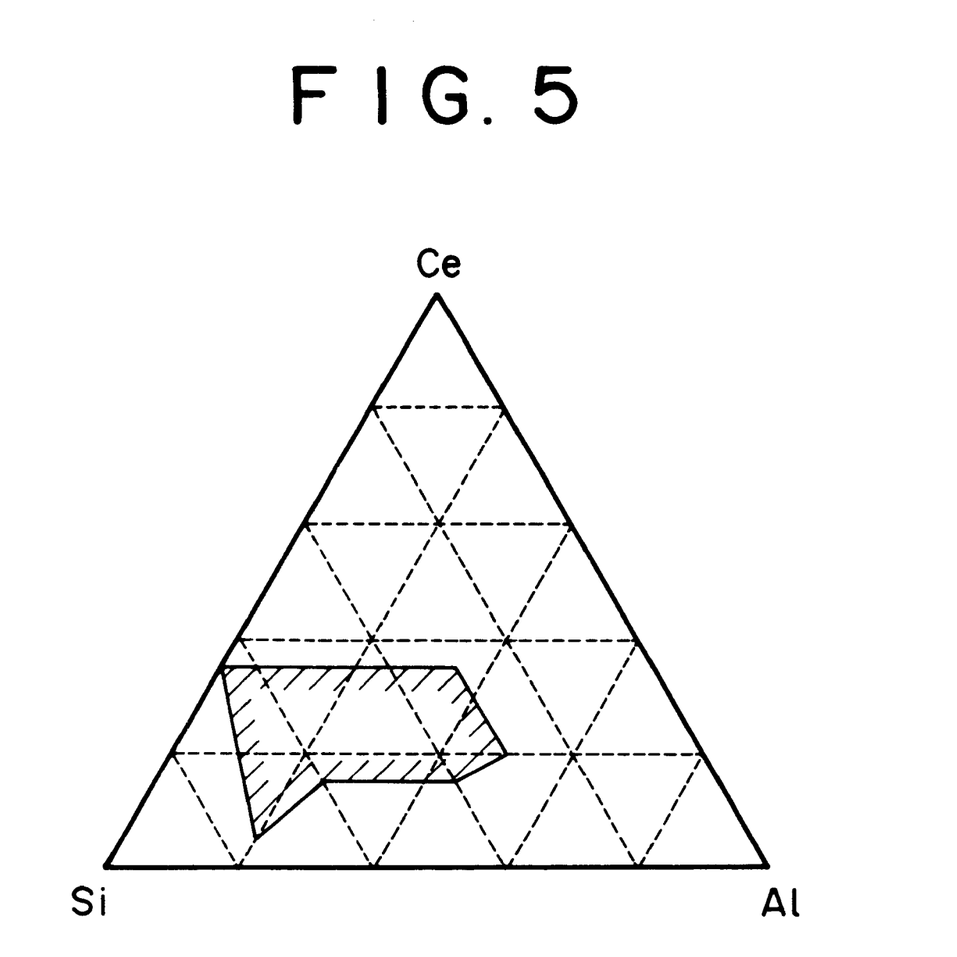
FIG. 5 is a diagram showing the desirable range of metallic components (Ce, Al, and Si) in the composition of an oxynitride glass represented by Ce—Al—Si—O—N, with the content of N defined by 5 eq %≦N≦30 eq %.

It is particularly desirable that M$^1$ is one species selected from Ca, Mg, Y, Gd, and Ce and that the oxynitride glass of this composition contains N in an amount defined by 5 eq %≦N≦25 eq %, with O+N=100 eq %, the amount of metallic components (M$^1$, Al, and Si) is within the hatched area in the diagrams shown in FIGS. 1 to 5.

The present invention is also directed to a press-mold used for said oxynitride glass, said press-mold being made of graphite. Graphite has good heat resistance and prevents glass from sticking thereto. Graphite having a bulk density higher than 1.7 g/cm$^3$ is desirable for the press-mold so that it helps the press-molded product to have a smooth surface.

The present invention is also directed to a press-mold used for said oxynitride glass, said press-mold being made of glassy carbon. Like graphite, glassy carbon has good heat resistance and prevents glass from sticking thereto. Glassy carbon having a bulk density higher than 1.5 g/cm$^3$ is desirable for the press-mold so that it helps the press-molded product to have a smooth surface.

The press-mold should preferably have surface smoothness such that the maximum height of irregularities (R$_{max}$) is 0.1–5 μm and the center line average roughness (R$_a$) is 0.01–0.5 μm (measured according to JIS B0601). This press-mold helps the press-molded product to have a smooth surface.

According to a preferred embodiment of the present invention, a discoid product with accurate dimensions, A mm in diameter and B mm in thickness, may be obtained by using a circular press-mold with a concave surface whose radius of curvature (R$_1$) along the center line of the roughness curve (measured according to JIS B0601) is greater than 1200×A mm.

The present invention covers a method of pressing an oxynitride glass by using the above-mentioned press-mold.

The press-molded product of oxynitride glass obtained by using the above-mentioned press-mold has surface roughness at its center such that the maximum height of irregularities ($R_{max}$) is smaller than 1 µm and the center line average roughness ($R_a$) is smaller than 0.1 µm (measured according to JIS B0601). This surface state only needs finish polishing for the molded product to be completed.

The present invention is directed to a discoid molded product (A mm in diameter and B mm in thickness) obtained by using the circular press-mold (defined in claim 6). This molded product has a curved concave or convex surface whose radius of curvature ($R_2$) along the center line of roughness curve (measured according to JIS B0601) is greater than 1200×A mm, and the molded product also has a thickness of 1.0–1.1×B mm. With such accurate dimensions, the molded product dispenses with polishing to remove much glass and helps reduce polishing cost.

The present invention is directed to a method of pressing an oxynitride glass by using a press-mold. This method employs a release layer containing carbon and/or boron nitride which is interposed between the press-mold and the oxynitride glass being press-molded. The release layer helps the oxynitride glass to be demolded easily after molding, and it also keeps the content of nitrogen in the molded oxynitride glass higher than 90% (by mass) of the original content before pressing.

According to a preferred embodiment, this release layer may be formed by applying a release agent to the surface of the press-mold and/or the surface of the oxynitride glass before pressing, said release agent containing carbon powder and/or boron nitride powder having an average particle diameter of 0.01–100 µm. The release layer may also be formed by deposition of carbon and/or boron nitride on the surface of the press-mold and/or the surface of the oxynitride glass before pressing.

The release layer should preferably be formed from a release agent in an amount of $1 \times 10^{-5}$–$5 \times 10^{-1}$ g per unit area (cm$^2$) of the surface of the molded product. Also, the release layer formed by deposition should preferably have a thickness of 0.001–10 µm.

The present invention is directed to a release layer used for pressing an oxynitride glass. This release layer contributes to a press-molded product of oxynitride glass having good surface smoothness. It is a film of amorphous carbon and/or amorphous carbon nitride formed by deposition. The deposited film of amorphous carbon and/or amorphous carbon nitride exhibits outstanding releasing performance at high temperatures in the pressing of an oxynitride glass. The deposited film firmly adheres to the molding surface of the press-mold and has a uniform thickness. Therefore, it prevents the oxynitride glass from sticking to the press-mold and hence helps give a press-molded product of oxynitride glass having good surface smoothness. The release layer should preferably have a thickness of 1–1000 nm.

The present invention is directed to a method of forming the release layer for pressing an oxynitride glass. This release layer is formed by physical deposition on the molding surface of the press-mold. The deposited film is compact and firmly adheres to the smooth molding surface of the press-mold and has a uniform thickness. Therefore, it exhibits good releasing performance and helps give a press-molded product of oxynitride glass having good surface smoothness.

The physical deposition should preferably be carried out by sputtering with amorphous carbon and/or amorphous carbon nitride under the following conditions.

Temperature of the molding surface of the press-mold: 0–400° C.

Gas pressure for sputtering 0.1–3 Pa

Power density for sputtering: 1–10 W/cm$^2$

DESCRIPTION OF THE PREFERRED EMBODIMENTS

In search of conditions for pressing an oxynitride glass into a disk, the present inventors found that it is possible to obtain a disk having a radius of r and a thickness of 2h if pressing is accomplished under the condition defined by the following expression.

$$1900 \geq T \geq 100 \times \log_{10}\left(\frac{0.045 \times \pi \times r^4}{t \times h^2 \times F}\right) + A \tag{1}$$

where,

F: pressing load (N)

T: pressing temperature (° C.)

t: pressing time (s)

π: ratio of the circumference to its diameter r: radius of disk formed by pressing (mm)

h: half a thickness of disk formed by pressing (mm)

A: constant depending on glass composition (° C.) defined by 1450° C.≦A≦650° C.

In the above expression, A, r, and h are constants, and F, T, and t are variables. (A will be explained later.) The pressing temperature should be lower than 1900° C. so as to prevent the oxynitride glass from decreasing nitrogen content and Young's modulus. Under such conditions, it is impossible to obtain a disk of oxynitride glass having a high specific rigidity desired.

Pressing with a pressing load (F), a pressing temperature (T), and pressing time (t) outside the above-defined range will not give a disk having a radius (r) and a thickness (2h). In other words, the resulting disk will have a diameter smaller than the intended diameter (r). The viscosity of an oxynitride glass varies depending on the pressing temperature (T). The radius of the disk obtained by pressing varies depending on the pressing load (F) and pressing time (t). Therefore, the pressing load (F), pressing time (t), and pressing temperature (T) are regarded as variables in the expression (1) above. When these variables are properly selected so that the expression (1) is satisfied, it is possible to obtain a disk of desired shape. Thus the present invention enables industrial production of high-performance glass disks having a high Young's modulus. Incidentally, the shape of glass before pressing is not specifically restricted. The result of pressing is determined by the radius (r) and the above-mentioned variables, not by the shape before pressing.

The term A in the expression (1) is a constant which depends on the composition of the oxynitride glass. This term is added because the viscosity of the oxynitride glass varies depending on its composition. The value of A ranges from 650 to 1450 depending on the composition of individual oxynitride glasses.

The oxynitride glass capable of pressing into a disk under the above-mentioned conditions should have the composition explained in the following. According to the present invention, the disk should be formed from:

1) an oxynitride glass having a composition represented by $M^1$—Al—Si—O—N ($M^1$ denoting one or more species selected from Ca, Mg, Y, Gd, Ce, and La), or
2) an oxynitride glass having a composition represented by $M^2$—Si—O—N ($M^2$ denoting Ca and/or Mg), or
3) a mixture composed of more than one kind the above-mentioned glass.

The first composition may contain more than one metallic element represented by $M^1$ (denoting Ca, Mg, Y, Gd, Ce, and La). The second composition may also contain both Mg and Ca. More than one kind the above-mentioned glass may be mixed together before pressing.

The oxynitride glass used in the present invention is specified by its nitrogen content such that 5 eq % $\leq$ N $\leq$ 25 eq %, with O+N=100 eq %. With a nitrogen content lower than 5 eq %, the oxynitride glass yields a disk having a low Young's modulus. With a nitrogen content higher than 25 eq %, the oxynitride glass will yield a disk in which silicon nitride separates out.

The content of three metallic components $M^1$, Al, and Si (with $M^1$+Al+Si=100 eq %) should be within the hatched area indicated in the diagram (FIGS. 1 to 5) showing the composition of the oxynitride glasses represented respectively by Ca—Al—Si—O—N, Mg—Al—Si—O—N, Y—Al—Si—O—N, Gd—Al—Si—O—N, and Ce—Al—Si—O—N. The oxynitride glasses have good moldability and yield disks having good performance. The composition defined by the hatched area was found essential for the oxynitride glass to be homogenous and to possess a high Young's modulus, as mentioned in Japanese Patent Application No. 96987/1999 filed by the present applicant.

In the foregoing expression (1), the value of A (° C.) varies depending on the glass composition. In the case of oxynitride glass containing 5 eq % N (with O+N=100 eq %) and having the composition of $M^1$—Al—Si—O—N ($M^1$ denoting one or more than one member selected from Ca, Mg, Y, Gd, Ce, and La), the value of A is 850 if $M^1$ is Ca, 650 if $M^1$ is Mg, 1150 if $M^1$ is Y, 1250 if $M^1$ is Gd, and 1200 if $M^1$ is Ce. In the case of oxynitride glass containing 20 eq % N (with O+N=100 eq %) and having the same composition as above, the value of A is 1000 if $M^1$ is Ca, 800 if $M^1$ is Mg, 1300 if $M^1$ is Y, 1400 if $M^1$ is Gd, and 1350 if $M^1$ is Ce. The values of A in the latter case are greater than those in the former case by 150.

In the case of oxynitride glass containing 25 eq % N (with O+N=100 eq %), the value of A is 1050 if $M^1$ is Ca, 850 if $M^1$ is Mg, 1350 if $M^1$ is Y, 1450 if $M^1$ is Gd, and 1400 if $M^1$ is Ce. The values of A in this case are greater by 200 or 50, respectively, than those in the case where nitrogen content is 5 eq % or 20 eq %.

In other words, the value of A for the 5% nitrogen content increases by 10° C. as nitrogen content increases by 1%. It is essential to establish the correct value of A so that the expression (1) works satisfactorily for pressing. In the case of oxynitride glass having the composition of $M^2$—Si—O—N ($M^2$ denoting Ca and/or Mg), the value of A is 850° C. if $M^2$ is Ca and 650° C. if $M^2$ is Mg. In the case of a mixture of oxynitride glasses, the value of A should be established in consideration of their mixing ratio (in terms of equivalent).

The oxynitride glass is produced from a mixture of metal oxide (such as $SiO_2$, $Al_2O_3$, MgO, and CaO) and nitride (such as $Si_3N_4$, AlN, and BN) by melting at a temperature and ensuing quenching. Other methods include the melting of a metal oxide in $N_2$ gas or $NH_3$ gas, the bubbling of $N_2$ gas or $NH_3$ gas in molten glass, and the sintering of porous glass in $NH_3$ gas.

The present invention is directed to pressing an oxynitride glass with a press-mold made of graphite. Graphite has good heat resistance and functions as an abherent for molten glass. The one having a bulk density higher than 1.7 g/cm³ should be used so that the press-mold has a smooth molding surface.

The present invention is directed to pressing an oxynitride glass with a press-mold made of glassy carbon. Like graphite, glassy carbon has good heat resistance and functions as an abherent for molten glass. The one having a bulk density higher than 1.5 g/cm³ should be used so that the press-mold has a smooth molding surface.

The present invention also covers a press-molded product formed from an oxynitride glass by using the above-mentioned press-mold.

The present invention also covers a method of carrying out the pressing by using a press-mold which has a release layer (between the press-mold and the oxynitride glass) which is 0.001–10 µm thick and contains carbon particles and/or boron nitride particles having an average particle diameter of 0.01–100 µm.

The release layer should preferably have a thickness in the range of 0.001 to 10 µm. The present invention also covers a press-molded product formed from an oxynitride glass by the above-mentioned pressing method.

The present invention is directed to a method of pressing an oxynitride glass by using a press-mold with a release layer between the press-mold and the oxynitride glass. This release layer is 1–1000 nm thick and is composed of amorphous carbon and/or amorphous carbon nitride formed by deposition. The deposited film has a uniform thickness and firmly adheres to the molding surface of the press-mold. It functions as an abherent for molten glass and helps the molded product to have a smooth surface. The release layer should preferably have a thickness of 1–1000 nm.

The present inventors' research revealed that a thin glass plate warps due to permanent strain that occurs during the glass making process. It was found that the reduction of permanent strain greatly reduces disk warpage. In other words, the glass used for recording medium is characterized by its coefficient of thermal expansion such that the measured values in the temperature range from [(Tg−20)/2]° C. to (Tg−20)° C. give a regression coefficient ($R^2$) greater than 0.9 when they are substituted in the expression (2). Any glass having a value of $R^2$ smaller than 0.9 has a large residual stress which causes the thin disk made from it to warp to such an extent that the disk (with the flatness greater than 10 µm) is not suitable for use as a hard disk substrate. The value of $R^2$ should preferably be greater than 0.99. The above-specified glass for recording medium may be obtained by cooling molten glass at a rate of 100° C./h in the temperature range from 1100° C. to 700° C., or by keeping molten glass at a temperature from 1100° C. to 700° C. for 10 minutes or more. Incidentally, it is not necessary that the above-mentioned heat treatment be carried out in the cooling step that follows glass melting. The heat treatment may be carried out after reheating that follows the steps of glass melting and cooling.

$$R^2 = \frac{\{n(\sum XY) - (\sum X)(\sum Y)\}^2}{\{n\sum X^2 - (\sum X)^2\}\{n\sum Y^2 - (\sum Y)^2\}} \quad (2)$$

where, X denotes the temperature (° C.), Y denotes the coefficient of thermal expansion (%), and n denotes the number of measurements.

There is an instance where a press-molded product of oxynitride glass warps or contains hard crystalline particles depending on its cooling conditions. In such an instance, the molded product is not given the desired shape and surface state by polishing. This problem is solved by quenching and annealing.

EXAMPLES

To further illustrate the invention, and not by way of limitation, the following examples are given.

Example 1

There were prepared samples of oxynitride glass represented by $M^1$—Al—Si—O—N (where $M^1$ stands for Ca, Mg, Y, Gd, or Ce), each having the composition as shown in Table 1. The composition is made up of 100 eq % of oxygen and nitrogen and 100 eq % of metallic elements.

TABLE 1

| Sample No. | $M^1$ | | Si | Al | O | N |
|---|---|---|---|---|---|---|
| Ca-N20 | $M^1$ | = Ca | 20 | 60 | 20 | 80 | 20 |
| Mg-N20 | $M^1$ | = Mg | 20 | 60 | 20 | 80 | 20 |
| Y-N20 | $M^1$ | = Y | 20 | 60 | 20 | 80 | 20 |
| Gd-N20 | $M^1$ | = Gd | 20 | 60 | 20 | 80 | 20 |
| Ce-N20 | $M^1$ | = Ce | 20 | 60 | 20 | 80 | 20 |
| Ca-N5 | $M^1$ | = Ca | 10 | 70 | 20 | 95 | 5 |
| Mg-N5 | $M^1$ | = Mg | 20 | 70 | 10 | 95 | 5 |
| Y-N5 | $M^1$ | = Y | 30 | 60 | 10 | 95 | 5 |
| Gd-Nb | $M^1$ | = Gd | 30 | 60 | 10 | 95 | 5 |
| Ce-N5 | $M^1$ | = Ce | 10 | 70 | 20 | 95 | 5 |
| Ca-N25 | $M^1$ | = Ca | 20 | 30 | 50 | 75 | 25 |
| Mg-N25 | $M^1$ | = Mg | 10 | 70 | 20 | 75 | 25 |
| Y-N25 | $M^1$ | = Y | 20 | 30 | 50 | 75 | 25 |
| Gd-N25 | $M^1$ | = Gd | 20 | 30 | 50 | 75 | 25 |
| Ce-N25 | $M^1$ | = Ce | 20 | 40 | 40 | 75 | 25 |

Each sample (in the form of gob) was press-molded under different conditions in a press-mold to give a disk having a radius of 48 mm and half a thickness (h) of 0.6 mm. The pressing load (F) ranged from 1960 to 14210 N, and the pressing time (t) ranged from 1 to 30 s. The lower limit of the pressing temperature required to make the disk having a radius of 48 mm from each sample was calculated from the expression (1). The results are shown in Tables 2 to 4. The disks actually obtained by the pressing experiment differed in radius depending on the pressing temperature and time as shown in Tables 5 to 20.

TABLE 2

| Sample No. | Pressing load F (N) | Pressing time t (s) | Half a thickness h (mm) | Radius r (mm) | A | Lower limit of T in expression (1) |
|---|---|---|---|---|---|---|
| Ca-N20 | 14210 | 1 | 0.6 | 48 | 1000 | 1216.6 |
| | 14210 | 5 | 0.6 | 48 | 1000 | 1146.7 |
| | 14210 | 10 | 0.6 | 48 | 1000 | 1116.6 |
| | 14210 | 20 | 0.6 | 48 | 1000 | 1086.5 |
| | 14210 | 30 | 0.6 | 48 | 1000 | 1068.9 |
| | 1960 | 1 | 0.6 | 48 | 1000 | 1302.7 |
| | 4900 | 1 | 0.6 | 48 | 1000 | 1262.9 |
| | 9800 | 1 | 0.6 | 48 | 1000 | 1232.8 |
| | 14700 | 1 | 0.6 | 48 | 1000 | 1215.1 |
| Mg-N20 | 14210 | 1 | 0.6 | 48 | 800 | 1016.6 |
| | 14210 | 5 | 0.6 | 48 | 800 | 946.7 |
| | 14210 | 10 | 0.6 | 48 | 800 | 916.6 |
| | 14210 | 20 | 0.6 | 48 | 800 | 886.5 |
| | 14210 | 30 | 0.6 | 48 | 800 | 868.9 |
| | 1960 | 1 | 0.6 | 48 | 800 | 1102.7 |
| | 4900 | 1 | 0.6 | 48 | 800 | 1062.9 |
| | 9800 | 1 | 0.6 | 48 | 800 | 1032.8 |
| | 14700 | 1 | 0.6 | 48 | 800 | 1015.1 |
| Y-N20 | 14210 | 1 | 0.6 | 48 | 1300 | 1516.6 |
| | 14210 | 5 | 0.6 | 48 | 1300 | 1446.7 |
| | 14210 | 10 | 0.6 | 48 | 1300 | 1416.6 |
| | 14210 | 20 | 0.6 | 48 | 1300 | 1386.5 |
| | 14210 | 30 | 0.6 | 48 | 1300 | 1368.9 |
| | 1960 | 1 | 0.6 | 48 | 1300 | 1602.7 |
| | 4900 | 1 | 0.6 | 48 | 1300 | 1562.9 |
| | 9800 | 1 | 0.6 | 48 | 1300 | 1532.8 |
| | 14700 | 1 | 0.6 | 48 | 1300 | 1515.1 |
| Gd-N20 | 14210 | 1 | 0.6 | 48 | 1400 | 1616.6 |
| | 14210 | 5 | 0.6 | 48 | 1400 | 1546.7 |
| | 14210 | 10 | 0.6 | 48 | 1400 | 1516.6 |
| | 14210 | 20 | 0.6 | 48 | 1400 | 1485.5 |
| | 14210 | 30 | 0.6 | 48 | 1400 | 1468.9 |
| | 1960 | 1 | 0.6 | 48 | 1400 | 1702.7 |
| | 4900 | 1 | 0.6 | 48 | 1400 | 1662.9 |
| | 9800 | 1 | 0.6 | 48 | 1400 | 1632.8 |
| | 14700 | 1 | 0.6 | 48 | 1400 | 1615.1 |
| Ce-N20 | 14210 | 1 | 0.6 | 48 | 1350 | 1566.6 |
| | 14210 | 5 | 0.6 | 48 | 1350 | 1496.7 |
| | 14210 | 10 | 0.6 | 48 | 1350 | 1566.6 |
| | 14210 | 20 | 0.6 | 48 | 1350 | 1436.5 |
| | 14210 | 30 | 0.6 | 48 | 1350 | 1418.9 |
| | 1960 | 1 | 0.6 | 48 | 1350 | 1652.7 |
| | 4900 | 1 | 0.6 | 48 | 1350 | 1612.7 |
| | 9800 | 1 | 0.6 | 48 | 1350 | 1582.8 |
| | 14700 | 1 | 0.6 | 48 | 1350 | 1565.1 |

TABLE 3

| Sample No. | Pressing load F (N) | Pressing time t (s) | Half a thickness h (mm) | Radius r (mm) | A | Lower limit of T in expression (1) |
|---|---|---|---|---|---|---|
| Ca-N5 | 14210 | 1 | 0.6 | 48 | 850 | 1066.6 |
| | 14210 | 5 | 0.6 | 48 | 850 | 996.7 |
| | 14210 | 10 | 0.6 | 48 | 850 | 966.6 |
| | 14210 | 20 | 0.6 | 48 | 850 | 936.5 |
| | 14210 | 30 | 0.6 | 48 | 850 | 918.9 |
| | 1960 | 1 | 0.6 | 48 | 850 | 1152.7 |
| | 4900 | 1 | 0.6 | 48 | 850 | 1112.9 |
| | 9800 | 1 | 0.6 | 48 | 850 | 1082.8 |
| | 14700 | 1 | 0.6 | 48 | 850 | 1065.1 |
| Mg-N5 | 14210 | 1 | 0.6 | 48 | 650 | 866.6 |
| | 14210 | 5 | 0.6 | 48 | 650 | 796.7 |
| | 14210 | 10 | 0.6 | 48 | 650 | 766.6 |
| | 14210 | 20 | 0.6 | 48 | 650 | 736.5 |
| | 14210 | 30 | 0.6 | 48 | 650 | 718.9 |
| | 1960 | 1 | 0.6 | 48 | 650 | 952.7 |
| | 4900 | 1 | 0.6 | 48 | 650 | 912.9 |
| | 9800 | 1 | 0.6 | 48 | 650 | 882.8 |
| | 14700 | 1 | 0.6 | 48 | 650 | 865.1 |

TABLE 3-continued

| Sample No. | Pressing load F (N) | Pressing time t (s) | Half a thickness h (mm) | Radius r (mm) | A | Lower limit of T in expression (1) |
|---|---|---|---|---|---|---|
| Y-N5 | 14210 | 1 | 0.6 | 48 | 1150 | 1356.6 |
| | 14210 | 5 | 0.6 | 48 | 1150 | 1296.7 |
| | 14210 | 10 | 0.6 | 48 | 1150 | 1266.6 |
| | 14210 | 20 | 0.6 | 48 | 1150 | 1236.5 |
| | 14210 | 30 | 0.6 | 48 | 1150 | 1218.9 |
| | 1960 | 1 | 0.6 | 48 | 1150 | 1452.7 |
| | 4900 | 1 | 0.6 | 48 | 1150 | 1412.9 |
| | 9800 | 1 | 0.6 | 48 | 1150 | 1382.8 |
| | 14700 | 1 | 0.6 | 48 | 1150 | 1365.1 |
| Gd-N5 | 14210 | 1 | 0.6 | 48 | 1250 | 1466.6 |
| | 14210 | 5 | 0.6 | 48 | 1250 | 1396.7 |
| | 14210 | 10 | 0.6 | 48 | 1250 | 1366.6 |
| | 14210 | 20 | 0.6 | 48 | 1250 | 1336.5 |
| | 14210 | 30 | 0.6 | 48 | 1250 | 1318.9 |
| | 1960 | 1 | 0.6 | 48 | 1250 | 1552.7 |
| | 4900 | 1 | 0.6 | 48 | 1250 | 1512.9 |
| | 9800 | 1 | 0.6 | 48 | 1250 | 1482.8 |
| | 14700 | 1 | 0.6 | 48 | 1250 | 1465.1 |
| Ce-N5 | 14210 | 1 | 0.6 | 48 | 1200 | 1416.6 |
| | 14210 | 5 | 0.6 | 48 | 1200 | 1364.7 |
| | 14210 | 10 | 0.6 | 48 | 1200 | 1316.6 |
| | 14210 | 20 | 0.6 | 48 | 1200 | 1286.5 |
| | 14210 | 30 | 0.6 | 48 | 1200 | 1268.9 |
| | 1960 | 1 | 0.6 | 48 | 1200 | 1502.7 |
| | 4900 | 1 | 0.6 | 48 | 1200 | 1462.9 |
| | 9800 | 1 | 0.6 | 48 | 1200 | 1432.8 |
| | 14700 | 1 | 0.6 | 48 | 1200 | 1415.1 |

TABLE 4

| Sample No. | Pressing load F (N) | Pressing time t (s) | Half a thickness h (mm) | Radius r (mm) | A | Lower limit of T in expression (1) |
|---|---|---|---|---|---|---|
| Ca—N25 | 14210 | 1 | 0.6 | 48 | 1050 | 1266.6 |
| | 14210 | 5 | 0.6 | 48 | 1050 | 1196.7 |
| | 14210 | 10 | 0.6 | 48 | 1050 | 1166.6 |
| | 14210 | 20 | 0.6 | 48 | 1050 | 1136.5 |
| | 14210 | 30 | 0.6 | 48 | 1050 | 1118.9 |
| | 1960 | 1 | 0.6 | 48 | 1050 | 1352.7 |
| | 4900 | 1 | 0.6 | 48 | 1050 | 1312.9 |
| | 9800 | 1 | 0.6 | 48 | 1050 | 1282.8 |
| | 14700 | 1 | 0.6 | 48 | 1050 | 1265.1 |

TABLE 4-continued

| Sample No. | Pressing load F (N) | Pressing time t (s) | Half a thickness h (mm) | Radius r (mm) | A | Lower limit of T in expression (1) |
|---|---|---|---|---|---|---|
| Mg—N25 | 14210 | 1 | 0.6 | 48 | 850 | 1066.6 |
| | 14210 | 5 | 0.6 | 48 | 850 | 996.7 |
| | 14210 | 10 | 0.6 | 48 | 850 | 966.6 |
| | 14210 | 20 | 0.6 | 48 | 850 | 936.5 |
| | 14210 | 30 | 0.6 | 48 | 850 | 918.9 |
| | 1960 | 1 | 0.6 | 48 | 850 | 1152.7 |
| | 4900 | 1 | 0.6 | 48 | 850 | 1112.9 |
| | 9800 | 1 | 0.6 | 48 | 850 | 1082.8 |
| | 14700 | 1 | 0.6 | 48 | 850 | 1065.1 |
| Y—N25 | 14210 | 1 | 0.6 | 48 | 1350 | 1566.6 |
| | 14210 | 5 | 0.6 | 48 | 1350 | 1496.7 |
| | 14210 | 10 | 0.6 | 48 | 1350 | 1466.6 |
| | 14210 | 20 | 0.6 | 48 | 1350 | 1436.5 |
| | 14210 | 30 | 0.6 | 48 | 1350 | 1416.9 |
| | 1960 | 1 | 0.6 | 48 | 1350 | 1652.7 |
| | 4900 | 1 | 0.6 | 48 | 1350 | 1512.9 |
| | 9800 | 1 | 0.6 | 48 | 1350 | 1582.8 |
| | 14700 | 1 | 0.6 | 48 | 1350 | 1565.1 |
| Gd—N25 | 14210 | 1 | 0.6 | 48 | 1450 | 1666.6 |
| | 14210 | 5 | 0.6 | 48 | 1450 | 1596.7 |
| | 14210 | 10 | 0.6 | 48 | 1450 | 1566.6 |
| | 14210 | 20 | 0.6 | 48 | 1450 | 1536.5 |
| | 14210 | 30 | 0.6 | 48 | 1450 | 1518.9 |
| | 1960 | 1 | 0.6 | 48 | 1450 | 1752.7 |
| | 4900 | 1 | 0.6 | 48 | 1450 | 1712.9 |
| | 9800 | 1 | 0.6 | 48 | 1450 | 1682.8 |
| | 14700 | 1 | 0.6 | 48 | 1450 | 1665.1 |
| Ce—N25 | 14210 | 1 | 0.6 | 48 | 1400 | 1616.6 |
| | 14210 | 5 | 0.6 | 48 | 1400 | 1546.7 |
| | 14210 | 10 | 0.6 | 48 | 1400 | 1516.6 |
| | 14210 | 20 | 0.6 | 48 | 1400 | 1486.5 |
| | 14210 | 30 | 0.6 | 48 | 1400 | 1468.9 |
| | 1960 | 1 | 0.6 | 48 | 1400 | 1702.7 |
| | 4900 | 1 | 0.6 | 48 | 1400 | 1662.9 |
| | 9800 | 1 | 0.6 | 48 | 1400 | 1632.8 |
| | 14700 | 1 | 0 6 | 48 | 1400 | 1615.1 |

TABLE 5

| | | Actual pressing temperature T (° C.) | | | | | | | Lower limit of T |
|---|---|---|---|---|---|---|---|---|---|
| | | 800 | 900 | 1000 | 1100 | 1200 | 1300 | 1400 | in expression (1) |
| Pressing time t (s) | 1 | 17 | 22 | 30 | 39 | 47 | 48 | 48 | 1216.6 |
| | 5 | 20 | 27 | 36 | 47 | 48 | 48 | 48 | 1146.7 |
| | 10 | 22 | 30 | 39 | 47 | 48 | 48 | 48 | 1116.6 |
| | 20 | 24 | 32 | 43 | 48 | 48 | 48 | 48 | 1086.5 |
| | 30 | 25 | 34 | 45 | 48 | 48 | 48 | 48 | 1068.9 |

Ca-containing glass, with N = 20 eq %
Relation between pressing time (t) and pressing temperature (T)

TABLE 6

| | | Actual pressing temperature T (° C.) | | | | | | | Lower limit of T |
|---|---|---|---|---|---|---|---|---|---|
| | | 800 | 900 | 1000 | 1100 | 1200 | 1300 | 1400 | in expression (1) |
| Pressing time t (s) | 1 | 29 | 39 | 47 | 48 | 48 | 48 | 48 | 1016.6 |
| | 5 | 36 | 47 | 48 | 48 | 48 | 48 | 48 | 946.7 |

TABLE 6-continued

|  | | Actual pressing temperature T (° C.) | | | | | | | Lower limit of T |
|---|---|---|---|---|---|---|---|---|---|
|  | | 800 | 900 | 1000 | 1100 | 1200 | 1300 | 1400 | in expression (1) |
|  | 10 | 39 | 47 | 48 | 48 | 48 | 48 | 48 | 916.6 |
|  | 20 | 42 | 48 | 48 | 48 | 48 | 48 | 48 | 886.5 |
|  | 30 | 45 | 48 | 48 | 48 | 48 | 48 | 48 | 868.9 |

Mg-containing glass, with N = 20 eq %
Relation between pressing time (t) and pressing temperature (T)

TABLE 7

|  | | Actual pressing temperature T (° C.) | | | | | | | Lower limit of T |
|---|---|---|---|---|---|---|---|---|---|
|  | | 800 | 900 | 1000 | 1100 | 1200 | 1300 | 1400 | in expression (1) |
| Pressing time | 1 | 7 | 9 | 12 | 16 | 22 | 29 | 39 | 1516.6 |
| t (s) | 5 | 8 | 11 | 15 | 20 | 27 | 36 | 47 | 1446.7 |
|  | 10 | 9 | 12 | 16 | 22 | 29 | 39 | 47 | 1416.6 |
|  | 20 | 10 | 13 | 18 | 24 | 32 | 42 | 48 | 1386.5 |
|  | 30 | 10 | 14 | 19 | 25 | 33 | 45 | 48 | 1368.9 |

Y-containing glass, with N = 20 eq %
Relation between pressing time (t) and pressing temperature (T)

Table 5 shows how the disk of Ca-N20 oxynitride glass varies in radius (mm) depending on the pressing temperature and the pressing time. Table 5 also shows the lower limits (° C.) of T in the expression (1) listed in Table 2. Boldface letters in Table 5 indicate that the pressing temperature and pressing time in the columns and rows including them are adequate for the disks to have the radius of 48 mm. Italic letters in Table 5 indicate that the pressing temperature and pressing time in the columns and rows including them are inadequate for the disks to have the radius of 48 mm. This inadequacy is due to the fact that pressing was carried out at a temperature lower than the lower limit (T) in the expression (1). Thus the expression (1) was proved to be correct.

Table 6 shows the results of experiments with Mg-N20 oxynitride glass as in Table 5. In this case, too, the expression (1) was proved to be correct. Table 7 shows the results of experiments with Y-N20 oxynitride glass as in Table 5. in this case, too, the expression (1) was proved to be correct. Incidentally, Ge-N20 oxynitride glass and Ce-N20 oxynitride glass did not give disks having a radius of 48 mm if the pressing temperature is lower than 1400° C. and the pressing time is shorter than 30 seconds.

TABLE 8

|  | | Actual pressing temperature T (° C.) | | | | | | | Lower limit of T |
|---|---|---|---|---|---|---|---|---|---|
|  | | 800 | 900 | 1000 | 1100 | 1200 | 1300 | 1400 | in expression (1) |
| Pressing time | 1 | 25 | 34 | 45 | 48 | 48 | 48 | 48 | 1066.6 |
| t (s) | 5 | 31 | 41 | 48 | 48 | 48 | 48 | 48 | 996.7 |
|  | 10 | 34 | 45 | 48 | 48 | 48 | 48 | 48 | 966.6 |
|  | 20 | 37 | 47 | 48 | 48 | 48 | 48 | 48 | 936.5 |
|  | 30 | 39 | 47 | 48 | 48 | 48 | 48 | 48 | 918.9 |

Ca-containing glass, with N = 5 eq %
Relation between pressing time (t) and pressing temperature (T)

TABLE 9

|  | | Actual pressing temperature T (° C.) | | | | | | | Lower limit of T |
|---|---|---|---|---|---|---|---|---|---|
|  | | 800 | 900 | 1000 | 1100 | 1200 | 1300 | 1400 | in expression (1) |
| Pressing time | 1 | 45 | 48 | 48 | 48 | 48 | 48 | 48 | 866.6 |
| t (s) | 5 | 48 | 48 | 48 | 48 | 48 | 48 | 48 | 796.7 |
|  | 10 | 48 | 48 | 48 | 48 | 48 | 48 | 48 | 766.6 |
|  | 20 | 48 | 48 | 48 | 48 | 48 | 48 | 48 | 736.5 |
|  | 30 | 48 | 48 | 48 | 48 | 48 | 48 | 48 | 718.9 |

Mg-containing glass, with N = 5 eq %
Relation between pressing time (t) and pressing temperature (T)

TABLE 10

| | | \multicolumn{7}{c|}{Actual pressing temperature T (° C.)} | Lower limit of T |
| | | 800 | 900 | 1000 | 1100 | 1200 | 1300 | 1400 | in expression (1) |
|---|---|---|---|---|---|---|---|---|---|
| Pressing time | 1 | 10 | 14 | 19 | 25 | 34 | 45 | 48 | 1366.6 |
| t (s) | 5 | 13 | 17 | 23 | 31 | 41 | 48 | 48 | 1296.7 |
| | 10 | 14 | 19 | 25 | 34 | 45 | 48 | 48 | 1266.6 |
| | 20 | 15 | 20 | 27 | 37 | 47 | 48 | 48 | 1236.5 |
| | 30 | 16 | 21 | 29 | 39 | 47 | 48 | 48 | 1218.9 |

Y-containing glass, with N = 5 eq %
Relation between pressing time (t) and pressing temperature (T)

TABLE 11

| | | \multicolumn{7}{c|}{Actual pressing temperature T (° C.)} | Lower limit of T |
| | | 800 | 900 | 1000 | 1100 | 1200 | 1300 | 1400 | in expression (1) |
|---|---|---|---|---|---|---|---|---|---|
| Pressing | 1 | 8 | 10 | 14 | 19 | 25 | 34 | 45 | 1466.6 |
| time t | 5 | 10 | 13 | 17 | 23 | 31 | 41 | 48 | 1396.7 |
| (s) | 10 | 11 | 14 | 19 | 25 | 34 | 45 | 48 | 1136.6 |
| | 20 | 12 | 15 | 21 | 28 | 37 | 47 | 48 | 1336.5 |
| | 30 | 12 | 16 | 22 | 29 | 39 | 47 | 48 | 1318.9 |

Gd-containing glass, with N = 5 eq %
Relation between pressing time (t) and pressing temperature (T)

TABLE 12

| | | \multicolumn{7}{c|}{Actual pressing temperature T (° C.)} | Lower limit of T |
| | | 800 | 900 | 1000 | 1100 | 1200 | 1300 | 1400 | in expression (1) |
|---|---|---|---|---|---|---|---|---|---|
| Pressing | 1 | 9 | 12 | 16 | 22 | 29 | 39 | 47 | 1416.6 |
| time t | 5 | 11 | 15 | 20 | 27 | 36 | 47 | 48 | 1346.7 |
| (s) | 10 | 12 | 17 | 22 | 29 | 39 | 47 | 48 | 1316.6 |
| | 20 | 13 | 18 | 24 | 32 | 42 | 48 | 48 | 1286.5 |
| | 30 | 14 | 19 | 25 | 33 | 45 | 48 | 48 | 1268.9 |

Ce-containing glass, with N = 5 eq %
Relation between pressing time (t) and pressing temperature (T)

Tables 8 to 12 show the results of experiments with oxynitride glass containing N=5 eq % as in Table 5. In all the cases, the oxynitride glass did not give disks having a radius of 48 mm if the pressing temperature is lower than the lower limit (T) in the expression (1), whereas it gave disks having a radius of 48 mm if the pressing temperature is higher than the lower limit (T) in the expression (1).

TABLE 13

| | | \multicolumn{7}{c|}{Actual pressing temperature T (° C.)} | Lower limit of T |
| | | 800 | 900 | 1000 | 1100 | 1200 | 1300 | 1400 | in expression (1) |
|---|---|---|---|---|---|---|---|---|---|
| Pressing time (t) | 1 | 14 | 19 | 25 | 34 | 45 | 48 | 48 | 1256.6 |
| | 5 | 17 | 23 | 31 | 41 | 48 | 48 | 48 | 1196.7 |
| | 10 | 19 | 25 | 34 | 45 | 48 | 48 | 48 | 1166.6 |
| | 20 | 20 | 27 | 37 | 47 | 48 | 48 | 48 | 1136.5 |
| | 30 | 21 | 29 | 39 | 47 | 48 | 48 | 48 | 1118.9 |

Ca-containing glass, with N = 25 eq%
Relation between pressing time (t) and pressing temperature (T)

TABLE 14

| | | \multicolumn{7}{c|}{Actual pressing temperature T (° C.)} | Lower limit of T |
| | | 800 | 900 | 1000 | 1100 | 1200 | 1300 | 1400 | in expression (1) |
|---|---|---|---|---|---|---|---|---|---|
| Pressing time (t) | 1 | 25 | 34 | 45 | 48 | 48 | 48 | 48 | 1066.6 |
| | 5 | 31 | 41 | 48 | 48 | 48 | 48 | 48 | 996.7 |
| | 10 | 34 | 45 | 48 | 48 | 48 | 48 | 48 | 966.6 |

TABLE 14-continued

|  | Actual pressing temperature T (° C.) | | | | | | | Lower limit of T |
|---|---|---|---|---|---|---|---|---|
|  | 800 | 900 | 1000 | 1100 | 1200 | 1300 | 1400 | in expression (1) |
| 20 | 34 | 47 | 48 | 48 | 48 | 48 | 48 | 936.5 |
| 30 | 39 | 47 | 48 | 48 | 48 | 48 | 48 | 918.9 |

Mg-containing glass, with N = 25 eq%
Relation between pressing time (t) and pressing temperature (T)

Tables 13 and 14 show the results of experiments with Ca-N25 and Mg-N25 oxynitride glass as in Table 5. In all the cases, the oxynitride glass did not give disks having a radius of 48 mm if the pressing temperature is lower than the lower limit (T) in the expression (1), whereas it gave disks having a radius of 48 nm if the pressing temperature is higher than the lower limit (T) in the expression (1). Incidentally, oxynitride glass containing Y, Gd, or Ce did not give disks having a radius of 48 mm under these pressing conditions.

TABLE 15

|  |  | Actual pressing temperature T (° C.) | | | | | Lower limit of T |
|---|---|---|---|---|---|---|---|
|  |  | 1000 | 1100 | 1200 | 1300 | 1400 | in expression (1) |
| Load F | 1960 | 23 | 30 | 40 | 47 | 48 | 1302.7 |
| (N) | 4900 | 25 | 34 | 45 | 48 | 48 | 1262.9 |
|  | 9800 | 28 | 37 | 47 | 48 | 48 | 1232.8 |
|  | 14700 | 29 | 39 | 47 | 48 | 48 | 1215.1 |

Ca-containing glass, with N = 20 eq %
Relation between pressing load (F) and pressing temperature (T)

TABLE 16

|  |  | Actual pressing temperature T (° C.) | | | | | Lower limit of T |
|---|---|---|---|---|---|---|---|
|  |  | 1000 | 1100 | 1200 | 1300 | 1400 | in expression (1) |
| Load F | 1960 | 40 | 47 | 48 | 48 | 48 | 1102.7 |
| (N) | 4900 | 45 | 48 | 48 | 48 | 48 | 1062.9 |
|  | 9800 | 47 | 48 | 48 | 48 | 48 | 1032.8 |
|  | 14700 | 47 | 48 | 48 | 48 | 48 | 1015.1 |

Mg-containing glass, with N = 20 eq %
Relation between pressing load (F) and pressing temperature (T)

Tables 15 and 16 show the results of experiments with Ca-N20 and Mg-N20 oxynitride glass under different conditions for pressing load (F) and pressing temperature (T). In all the cases, the oxynitride glass did not give disks having a radius of 48 mm if the pressing temperature is lower than the lower limit (T) in the expression (1), whereas it gave disks having a radius of 48 mm if the pressing temperature is higher than the lower limit (T) in the expression (1). Incidentally, oxynitride glass containing Y, Gd, or Ce did not give disks having a radius of 48 mm under these pressing conditions.

TABLE 17

|  |  | Actual pressing temperature T (° C.) | | | | | Lower limit of T |
|---|---|---|---|---|---|---|---|
|  |  | 1000 | 1100 | 1200 | 1300 | 1400 | in expression (1) |
| Load F | 1960 | 35 | 47 | 48 | 48 | 48 | 1152.7 |
| (N) | 4900 | 39 | 47 | 48 | 48 | 48 | 1112.9 |

TABLE 17-continued

|  |  | Actual pressing temperature T (° C.) | | | | | Lower limit of T |
|---|---|---|---|---|---|---|---|
|  |  | 1000 | 1100 | 1200 | 1300 | 1400 | in expression (1) |
|  | 9800 | 44 | 48 | 48 | 48 | 48 | 1082.8 |
|  | 14700 | 45 | 48 | 48 | 48 | 48 | 1065.1 |

Ca-containing glass, with N = 5 eq %
Relation between pressing load (F) arid pressing temperature (T)

TABLE 18

|  |  | Actual pressing temperature T (° C.) | | | | | Lower limit of T |
|---|---|---|---|---|---|---|---|
|  |  | 1000 | 1100 | 1200 | 1300 | 1400 | in expression (1) |
| Load F | 1960 | 14 | 19 | 26 | 35 | 47 | 1452.7 |
| (N) | 4900 | 16 | 22 | 29 | 39 | 47 | 1412.9 |
|  | 9800 | 18 | 24 | 32 | 43 | 48 | 1382.8 |
|  | 14700 | 19 | 25 | 34 | 45 | 48 | 1365.1 |

Y-containing glass, with N = 5 eq %
Relation between pressing load (F) and pressing temperature (T)

Tables 17 and 18 show the results of experiments with Ca-N5 and Y-N5 oxynitride glass under different conditions for pressing load (F) and pressing temperature (T). In all the cases, the oxynitride glass did not give disks having a radius of 48 mm if the pressing temperature is lower than the lower limit (T) in the expression (1), whereas it gave disks having a radius of 48 mm if the pressing temperature is higher than the lower limit (T) in the expression (1). Incidentally, the Mg-containing oxynitride glass gave satisfactory disks but oxynitride glass containing Y, Gd, or Ce did not give disks having a radius of 48 mm under these pressing conditions.

TABLE 19

|  |  | Actual pressing temperature T (° C.) | | | | | Lower limit of T |
|---|---|---|---|---|---|---|---|
|  |  | 1000 | 1100 | 1200 | 1300 | 1400 | in expression (1) |
| Load F | 1960 | 19 | 26 | 35 | 47 | 48 | 1352.7 |
| (N) | 4900 | 22 | 29 | 39 | 47 | 48 | 1312.9 |
|  | 9800 | 24 | 37 | 43 | 48 | 48 | 1282.8 |
|  | 14700 | 25 | 34 | 45 | 48 | 48 | 1285.1 |

Ca-containing glass, with N = 25 eq %
Relation between pressing load (F) and pressing temperature (T)

TABLE 20

| | | Actual pressing temperature T (° C.) | | | | | Lower limit of T |
|---|---|---|---|---|---|---|---|
| | | 1000 | 1100 | 1200 | 1300 | 1400 | in expression (1) |
| Load F | 1960 | 35 | 47 | 48 | 48 | 48 | 1152.7 |
| (N) | 4900 | 39 | 47 | 48 | 48 | 48 | 1112.9 |
| | 9800 | 43 | 48 | 48 | 48 | 48 | 1082.8 |
| | 14700 | 45 | 48 | 48 | 48 | 48 | 1065.1 |

Mg-containing glass, with N = 25 eq %
Relation between pressing load (F) and pressing temperature (T)

Tables 19 and 20 show the results of experiments with Ca-N25 and Mg-N25 oxynitride glass under different conditions for pressing load (F) and pressing temperature (T). In all the cases, the oxynitride glass did not give disks having a radius of 48 mm if the pressing temperature is lower than the lower limit (T) in the expression (1), whereas it gave disks having a radius of 48 mm if the pressing temperature is higher than the lower limit (T) in the expression (1). Incidentally, oxynitride glass containing Y, Gd, or Ce did not give disks having a radius of 48 mm under these pressing conditions.

As mentioned above, pressing at a temperature above the lower limit in the expression (1) gave disks having the desired radius. This proves the expression (1) to be correct.

Example 2

A press-mold capable of forming a disk measuring 96 mm in diameter (A) and 1.2 mm in thickness (B) was prepared from each of isotropic graphite, glassy carbon, martensite stainless steel, and austenite stainless steel. Using this press-mold, experiments of pressing with reheating were performed on Ca—Al—Si—O—N oxynitride glass (containing 20 eq % Ca, 20 eq % Al, 60 eq % Si, 80 eq % 0, and 20 eq % N). The upper and lower circular molding surfaces of the press-mold were coated with 0.03 g each of boron nitride powder in spray form (having an average particle diameter of 10 μm) which is available from oriental Sangyo-sha, under a trade name of "Toyoka Ace BN". This coating serves as the release layer. In the press-mold was placed a discoid gob weighing 25.2±0.2 g and measuring 35.7±2.2 mm in diameter and 8.9±0.5 mm in thickness. The gob was pressed at 1124° C. for 140 seconds under a load of 35500 N.

After pressing, the molded disks were examined for heat resistance in terms of surface deformation at pressing temperatures After molding, the press-mold was examined for the sticking of glass to the molding surface. The results are shown in Table 21. Samples without deformation or sticking are indicated by ○ and samples with deformation or sticking are indicated by X.

TABLE 21

| Sample No. | Material of press-mold | Deformation | Sticking to press-mold | Remarks |
|---|---|---|---|---|
| 1 | Isotropic graphite | ○ | ○ | Example |
| 2 | Glassy carbon | ○ | ○ | Example |
| 3 | Martensite stainless steel | X | X | Comparative Example |
| 4 | Austenite stainless steel | X | X | Comparative Example |

It is apparent from Table 21 that the press-mold made of isotropic graphite and glassy carbon according to the present invention exhibits good heat resistance without sticking to oxynitride glass at the pressing temperature. This press-mold was proved to be suitable for oxynitride glass. By contrast, the press-mold made of martensite stainless steel or austenite stainless steel (in Comparative Example) was poor in heat resistance, causing the molded surface to deform. In addition, it stuck to glass. Thus these materials were found to be unsuitable for oxynitride glass.

Example 3

Press-molds were made of isotropic graphite or glassy carbon, each differing in bulk density. They were polished as follows to see if they give a desired surface smoothness. The press-sold is bonded to a ceramic plate (support) weighing 1 kg. Then the press-mold is set on a lapping apparatus, with the press-mold facing downward. A surface plate (with a flatness of ±1 μm) is brought (upward) into contact with the press-mold. The surface plate is turned at 60 rpm under a load of 1 kg (which is the weight of the ceramic plate). Diamond slurry having a particle diameter of 15 μm is used for rough grinding, and diamond slurry having a particle diameter of 1 μm is used for finish grinding. This abrasive was sprayed, together with a lubricant, onto the surface plate for 2 seconds each at intervals of 30 seconds. Polishing took about several minutes to ten-odds minutes.

The polished surface was tested for surface roughness by using a surface roughness tester of tracer type ("Tarysurf" from Taylor Hobson Co., Ltd.). The surface smoothness of the press-mold was rated as ○ if it has a maximum height of irregularities ($R_{max}$) smaller than 5 μm and a center line average roughness ($R_a$) smaller than 0.5 μm. It was rated as Δ if has a maximum height of irregularities ($R_{max}$) greater than 5 μm and a center line average roughness ($R_a$) greater than 0.5 μm. The results are shown in Table 22.

TABLE 22

| Sample No. | Material of press-mold | | Surface smoothness of press-mold | Remarks |
|---|---|---|---|---|
| | Material | Bulk density (g/cm³) | | |
| 5 | Isotropic graphite | 1.6 | Δ | Referential Example |
| 6 | Isotropic graphite | 1.7 | ○ | Example |
| 7 | Isotropic graphite | 1.8 | ○ | Example |
| 8 | Glassy carbon | 1.4 | Δ | Referential Example |
| 9 | Glassy carbon | 1.5 | ○ | Comparative Example |
| 10 | Glassy carbon | 1.6 | ○ | Comparative Example |

It is noted from Table 22 that the press-mold with good surface smoothness is obtained from graphite having a bulk density higher than 1.7 g/cm$^3$ or from glassy carbon having a bulk density higher than 1.5 g/cm$^3$.

Example 4

A press-mold capable of forming a disk measuring 96 mm in diameter and 1.2 mm in thickness was prepared from each of isotropic graphite. Using this press-mold, experiments of pressing with reheating were performed on Ca—Al—Si—O—N oxynitride glass (containing 20 eq % Ca, 20 eq % Al, 60 eq % Si, 80 eq % O, and 20 eq % N). Pressing was carried out at 1200° C. for 10 s under a load of 14220 N.

The molding surfaces of the press-mold were coated with carbon powder in spray form (having an average particle diameter of 20 μm) "Toyoka Ace Graphite" or boron nitride powder in spray form (having an average particle diameter of 10 μm) "Toyoka Ace BN", both available from Oriental Sangyo-sha. This coating serves as the release layer. For comparison, the release layer was prepared by spin coating and ensuing natural drying from silicon carbide powder (having an average particle diameter of 10 μm) or silicon nitride powder (having an average particle diameter of 10 μm) in the form of dispersion in n-hexane. The amount of the release layer was 0.001 g/cm$^2$. The releasability of the press-mold was evaluated according to the following criteria, and the molded product was analyzed in the following manner to see the amount of nitrogen which had decreased in the glass after pressing. The results are shown in Table 23.

(1) Releasability:

The samples were rated as ○, Δ, or X, respectively, depending on whether no sticking occurs, slight sticking occurs, or overall sticking occurs between the press-mold and the molded glass plate.

(2) Determination of Nitrogen in Press-Molded Glass:

The press-molded oxynitride glass disk is ultrasonically cleaned in acetone. The cleaned disk is bonded to a ceramic plate (support) weighing 1 kg. Then the disk is set on a lapping apparatus, with the disk facing downward. A surface plate (with a flatness of ±1 μm) is brought (upward) into contact with the disk. The surface plate is turned at 60 rpm under a load of 1 kg (which is the weight of the ceramic plate). For rough grinding, diamond slurry having a particle diameter of 15 μm is sprayed, together with a lubricant, onto the surface plate for 2 seconds at intervals of 30 seconds. After rough grinding to remove the colored release layer almost completely from the glass surface, fine polishing is carried out with diamond slurry having a particle diameter of 1 μm. Polishing takes about several minutes to ten-odds minutes. Before pressing and after pressing and polishing, the amount of nitrogen in the glass is determined by fluorescent X-ray analysis.

The samples are rated as ○, Δ, or X, respectively, depending on whether the amount of residual nitrogen is more than 90 mass %, from 80 to 90 mass %, or less than 80 mass %.

TABLE 23

| Sample No. | Release agent | Release layer | Releas-ability | Amount of nitrogen after pressing | Remarks |
| --- | --- | --- | --- | --- | --- |
| 1 | None | On press-mold surface | X | X | Comparative Example |
| 2 | Silicon carbide powder | On press-mold surface | ○ | X | Comparative Example |
| 3 | Silicon nitride powder | On press-mold surface | X | ○ | Comparative Example |
| 4 | Carbon powder | On press-mold surface | ○ | ○ | Example |
| 5 | Boron nitride powder | On press-mold surface | ○ | ○ | Example |

It is noted from Table 23 that sample No. 4 (which was formed by pressing in a press-mold having a release layer of carbon) and sample No. 5 (which was formed by pressing in a press-mold having a release layer of boron nitride) exhibit good releasability and show no sign of decrease in nitrogen content. Sample No. 1 (which was formed by pressing in a press-mold without release layer) is poor in releasability and decreases in nitrogen content. Sample No. 2 (which was formed by pressing in a press-mold having a release layer of silicon carbide) is good in releasability but decreases in nitrogen content. Sample No. 3 (which was formed by pressing in a press-mold having a release layer of silicon nitride) is poor in releasability although it shows no sign of decreases in nitrogen content.

Example 5

The same procedure as in Example 4 was repeated except that the release layer (on either glass gob or press-mold surface) was formed from carbon powder differing in average particle diameter and amount as shown in Table 24 or from boron nitride powder differing in average particle diameter and amount as shown in Table 25. The glass gob is a discoid glass lump, measuring 37.5±2.5 mm in diameter and 8.0±1.0 mm in thickness, which is not yet press-molded. The same procedure as mentioned above was used to evaluate the releasability and to determine the amount of residual nitrogen. The moldability was rated as ○ if the resulting disk had a thickness of 1.2±0.1 mm; it was rated as X otherwise.

TABLE 24

Pressing with a release layer formed from a release agent containing carbon powder

| Sample No. | Average particle diameter of carbon powder (μm) | Amount of release layer (g/cm²) | Place of release layer | Releas-ability | Nitrogen after pressing | Mod-ability | Remarks |
|---|---|---|---|---|---|---|---|
| 1 | non | non | non | X | X | X | Comparative Example |
| 6 | 0.005 | $1 \times 10^{-3}$ | On press-mold surface | Δ | ○ | ○ | Referential Example |
| 7 | 0.01 | $5 \times 10^{-6}$ | On press-mold surface | Δ | Δ | ○ | Referential Example |
| 8 | 0.01 | $1 \times 10^{-5}$ | On press-mold surface | ○ | ○ | ○ | Example |
| 9 | 0.01 | $1 \times 10^{-3}$ | On press-mold surface | ○ | ○ | ○ | Example |
| 10 | 0.01 | $5 \times 10^{-1}$ | On press-mold surface | ○ | ○ | ○ | Example |
| 11 | 0.01 | 1 | On press-mold surface | ○ | ○ | X | Referential Example |
| 12 | 1 | $5 \times 10^{-6}$ | On press-mold surface | Δ | Δ | ○ | Referential Example |
| 13 | 1 | $1 \times 10^{-5}$ | On press-mold surface | ○ | ○ | ○ | Example |
| 14 | 1 | $1 \times 10^{-3}$ | On press-mold surface | ○ | ○ | ○ | Example |
| 15 | 1 | $5 \times 10^{-1}$ | On press-mold surface | ○ | ○ | ○ | Example |
| 16 | 1 | 1 | On press-mold surface | ○ | ○ | X | Example |
| 17 | 100 | $5 \times 10^{-6}$ | On glass gob | Δ | Δ | ○ | Referential Example |
| 18 | 100 | $1 \times 10^{-5}$ | On glass gob | ○ | ○ | ○ | Example |
| 19 | 100 | $1 \times 10^{-3}$ | On glass gob | ○ | ○ | ○ | Example |
| 20 | 100 | $5 \times 10^{-1}$ | On glass gob | ○ | ○ | ○ | Example |
| 21 | 100 | 1 | On glass gob | ○ | ○ | X | Referential Example |
| 22 | 200 | $1 \times 10^{-3}$ | On glass gob | ○ | ○ | X | Referential Example |

TABLE 25

Pressing with a release layer formed from a release agent containing boron nitride (BN) powder

| Sample No. | Ave. particle diameter of boron nitride powder (μm) | Amount of release layer (g/cm²) | Place of release layer | Releas-ability | Nitrogen after pressing | Mod-ability | Remarks |
|---|---|---|---|---|---|---|---|
| 1 | non | non | non | X | X | X | Comparative Example |
| 23 | 0.005 | $1 \times 10^{-3}$ | On glass gob | Δ | ○ | ○ | Referential Example |
| 24 | 0.01 | $5 \times 10^{-4}$ | On glass gob | Δ | Δ | ○ | Referential Example |
| 25 | 0.01 | $1 \times 10^{-5}$ | On glass gob | ○ | ○ | ○ | Example |
| 26 | 0.01 | $1 \times 10^{-3}$ | On glass gob | ○ | ○ | ○ | Example |
| 27 | 0.01 | $5 \times 10^{-1}$ | On glass gob | ○ | ○ | ○ | Example |
| 28 | 0.01 | 1 | On glass gob | ○ | ○ | X | Referential Example |
| 29 | 1 | $5 \times 10^{-6}$ | On glass gob | Δ | Δ | ○ | Referential Example |

TABLE 25-continued

Pressing with a release layer formed from a release agent containing boron nitride (BN) powder

| Sample No. | Ave. particle diameter of boron nitride powder (μm) | Amount of release layer (g/cm²) | Place of release layer | Releasability | Nitrogen after pressing | Moldability | Remarks |
|---|---|---|---|---|---|---|---|
| 30 | 1 | $1 \times 10^{-5}$ | On glass gob | ○ | ○ | ○ | Example |
| 31 | 1 | $1 \times 10^{-3}$ | On glass gob | ○ | ○ | ○ | Example |
| 32 | 1 | $5 \times 10^{-1}$ | On glass gob | ○ | ○ | ○ | Example |
| 33 | 1 | 1 | On glass gob | ○ | ○ | X | Example |
| 34 | 100 | $5 \times 10^{-6}$ | On press-mold surface | Δ | Δ | ○ | Referential Example |
| 35 | 100 | $1 \times 10^{-5}$ | On press-mold surface | ○ | ○ | ○ | Example |
| 36 | 100 | $1 \times 10^{-3}$ | On press-mold surface | ○ | ○ | ○ | Example |
| 37 | 100 | $5 \times 10^{-1}$ | On press-mold surface | ○ | ○ | ○ | Example |
| 38 | 100 | 1 | On press-mold surface | ○ | ○ | X | Referential Example |
| 39 | 200 | $1 \times 10^{-3}$ | On press-mold surface | ○ | ○ | X | Referential Example |

It is noted from Tables 24 and 25 that good results are obtained when the powder of release agent has an average particle diameter of 0.01–100 μm and the amount of the release layer is $1 \times 10^{-5}$ to $5 \times 10^{-5}$ g/cm². Both carbon-based release agent and BN-based release agent meeting the requirement in this invention were superior in releasability, moldability, and the amount of nitrogen after pressing.

Example 6

Pressing was performed on a glass gob of the same composition as in Example 4. The glass gob was provided with a release layer formed by deposition under the following conditions.

Apparatus: plasma CVD apparatus
Pressure: 2666.4 Pa (20 Torr)
Substrate temperature: 400° C.
Microwave powers 900 W
Feed gas: a mixture of $CH_4$ and $H_2$ for carbon deposition.

The composition of feed gas was properly changed in the usual way according to the desired deposition.

Pressing was carried out under the same conditions as in Example 4. The results are shown in Table 26. They are the same as those in Table 23.

TABLE 26

| Sample No. | Release agent | Release layer | Releasability | Amount of nitrogen after pressing | Remarks |
|---|---|---|---|---|---|
| 1 | Non | Non | X | X | Comparative Example |
| 40 | Silicon carbide powder | On glass gob | ○ | X | Comparative Example |
| 41 | Silicon nitride powder | On glass gob | X | ○ | Comparative Example |
| 42 | Carbon powder | On glass gob | ○ | ○ | Example |
| 43 | Boron nitride powder | On glass gob | ○ | ○ | Example |

Example 7

The same procedure (for pressing) as in Example 4 was repeated except that the release layer of deposited film was changed in kind, thickness, and place where the release layer is formed. The results are shown in Table 27. In the case where the press-mold of glassy carbon was used, the same results as above were obtained.

It is apparent from Table 27 that good results were obtained when the release layer (formed by deposition) has a thickness of 0.001–10 μm.

TABLE 27

Pressing with a release layer of deposited film of carbon or boron nitride

| Sample No. | Kind of release layer | Thickness of release layer (μm) | Place of release layer | Releasability | Nitrogen after pressing | Modability | Remarks |
|---|---|---|---|---|---|---|---|
| 1 | non | non | non | X | X | X | Comparative Example |
| 44 | Carbon | 0.0005 | On press-mold surface | Δ | Δ | ○ | Referential Example |
| 45 | Carbon | 0.001 | On press-mold surface | ○ | ○ | ○ | Example |
| 46 | Carbon | 0.1 | On press-mold surface | ○ | ○ | ○ | Example |
| 47 | Carbon | 10 | On press-mold surface | ○ | ○ | ○ | Example |
| 48 | Carbon | 20 | On press-mold surface | ○ | ○ | X | Referential Example |
| 49 | Carbon | 0.0005 | On glass gob | Δ | Δ | ○ | Referential Example |
| 50 | Carbon | 0.001 | On glass gob | ○ | ○ | ○ | Example |
| 51 | Carbon | 0.1 | On glass gob | ○ | ○ | ○ | Example |
| 52 | Carbon | 10 | On glass gob | ○ | ○ | ○ | Example |
| 53 | Carbon | 20 | On glass gob | ○ | ○ | X | Referential Example |
| 54 | Boron nitride | 0.0005 | On press-mold surface | Δ | Δ | ○ | Referential Example |
| 55 | Boron nitride | 0.001 | On press-mold surface | ○ | ○ | ○ | Example |
| 56 | Boron nitride | 0.1 | On press-mold surface | ○ | ○ | ○ | Example |
| 57 | Boron nitride | 10 | On press-mold surface | ○ | ○ | ○ | Example |
| 58 | Boron nitride | 20 | On press-mold surface | ○ | ○ | X | Referential Example |
| 59 | Boron nitride | 0.0005 | On glass gob | Δ | Δ | ○ | Referential Example |
| 60 | Boron nitride | 0.001 | On glass gob | ○ | ○ | ○ | Example |
| 61 | Boron nitride | 0.1 | On glass gob | ○ | ○ | ○ | Example |
| 62 | Boron nitride | 10 | On glass gob | ○ | ○ | ○ | Example |
| 63 | Boron nitride | 20 | On glass gob | ○ | ○ | X | Referential Example |

Example 8

A press-mold to make a disk measuring 96 mm in diameter and 1.2 mm in thickness was formed from glassy carbon. The resulting press-mold was examined for surface roughness according to JIS B0601 by using a surface roughness tester of tracer type ("Tarysurf" from Taylor Hobson Co., Ltd.). It was found that the maximum height of irregularities ($R_{max}$) was 500 nm and the center line average roughness ($R_a$) was 50 nm.

The molding surface of the press-mold was coated with a release layer of amorphous carbon (1000 nm thick) by sputtering under the following conditions.

Sputtering apparatus: "SPUTTERING SYSTEM HSM-752" from Shimadzu Seisakusho

Sputtering target: carbon disk, 15.24 mm in diameter and 0.5 cm in thickness

Type of sputtering: DC magnetron sputtering

Temperature of substrate (press-mold): 20° C.

Sputtering gas: argon

Pressure of sputtering gas: 0.4 Pa

Sputtering power density (=sputtering power/area of sputtering target): 5.5 W/cm$^2$ Two additional press-molds were prepared which have the same surface roughness as mentioned above. One of them had its molding surface coated with amorphous carbon nitride film (1000 nm thick) by sputtering. The other of them had its molding surface coated with diamond film (1000 nm thick) by sputtering. Sputtering for the amorphous carbon nitride film was carried out under the same conditions as above except that the sputtering gas was a mixture of argon and nitrogen. Sputtering for the diamond film was carried out under the same conditions as above except that the substrate temperature was changed to 500° C. Incidentally, the amorphous carbon film, amorphous carbon nitride film, and diamond film were identified by Raman spectrometry. The release layer was examined for surface roughness by using a surface roughness tester of tracer type.

Using the press-mold mentioned above, experiments of pressing with reheating were performed on Ca—Al—Si—O—N oxynitride glass (containing 20 eq % Ca, 20 eq % Al, 60 eq % Si, 80 eq % O, and 20 eq % N). A discoid glass gob, weighing 25.2±0.2 g and measuring 35.7±2.2 mm in diameter and 8.9±0.5 mm in thickness, was placed in the press-mold, and pressing was carried out at 1200° C. for 140 s under a load of 43200 N. The releasability of the press-molds was evaluated. The press-molds were rated as ○, Δ, or X, respectively, depending on whether no sticking occurs, slight sticking occurs, or overall sticking occurs between the press-mold and the molded glass plate.

The resulting molded product was tested for surface roughness by using a surface roughness tester of tracer type (mentioned above). The surface smoothness of the molded product was rated as ○ if it has a maximum height of irregularities ($R_{max}$) smaller than 500 nm and a center line average roughness ($R_a$) smaller than 50 nm. Otherwise, it was rated as X. Table 28 shows the results of measurements of surface roughness and the results of evaluation of releasability and surface smoothness.

TABLE 28

| Sample No. | Kind of release layer | Surface roughness of release layer $R_{max}$ (nm) | $R_a$ (nm) | Releasability | Surface roughness of molded product $R_{max}$ (nm) | $R_a$ (nm) | Surface smoothness of molded product | Remarks |
|---|---|---|---|---|---|---|---|---|
| 1 | Amorphous carbon film | 400 | 45 | ○ | 380 | 40 | ○ | Example |
| 2 | Amorphous carbon nitride film | 420 | 48 | ○ | 410 | 45 | ○ | Example |
| 3 | Diamond film | 2100 | 190 | ○ | 1700 | 150 | X | Comparative Example |

It is noted from Table 28 that the release layer of amorphous carbon film (Sample No. 1) and the release layer of amorphous carbon nitride film (Sample No. 2) have a smooth surface and give molded products having a smooth surface. By contrast, the release layer of diamond film (Sample No. 3 for comparison) is good in releasability but gives molded products having a rough surface because it has a rough surface.

Example 9

A press-mold was formed from glassy carbon in the same way as in Example 8. This press-mold has a maximum height of irregularities ($R_{max}$) of 500 nm and a center line average roughness ($R_a$) of 50 nm. The molding surface of this press-mold was coated with amorphous carbon film or amorphous carbon nitride film having a thickness of 0.5, 1, 100, 1000, or 5000 nm, by sputtering in the same way as in Example 1. The thus obtained press-mold was used to press-mold oxynitride glass in the same way as in Example 8. The molded product was evaluated for releasability and surface smoothness according to the same criteria as in Example 1. The results are shown in Table 29.

TABLE 29

| Sample No. | Kind of release layer | Thickness of release layer (nm) | Releasability | Surface roughness of molded product $R_{max}$ (nm) | $R_a$ (nm) | Surface smoothness of molded product | Remarks |
|---|---|---|---|---|---|---|---|
| 4 | Amorphous carbon film | 0.5 | Δ | — | — | — | Referential Example |
| 5 | Amorphous carbon film | 1 | ○ | 460 | 45 | ○ | Example |
| 6 | Amorphous carbon film | 100 | ○ | 390 | 45 | ○ | Example |
| 7 | Amorphous carbon film | 1000 | ○ | 420 | 44 | ○ | Example |
| 8 | Amorphous carbon film | 5000 | ○ | 610 | 59 | Δ | Referential Example |
| 9 | Amorphous carbon nitride film | 0.5 | Δ | — | — | — | Referential Example |
| 10 | Amorphous carbon nitride film | 1 | ○ | 480 | 46 | ○ | Example |
| 11 | Amorphous carbon nitride film | 100 | ○ | 400 | 39 | ○ | Example |
| 12 | Amorphous carbon nitride film | 1000 | ○ | 450 | 47 | ○ | Example |
| 13 | Amorphous carbon nitride film | 5000 | ○ | 700 | 65 | Δ | Referential Example |

It is noted from Table 29 that the amorphous carbon film having a thickness of 1 to 1000 nm (Samples Nos. 5 to 7) and the amorphous carbon nitride film (Samples Nos. 10 to 12) has good releasability and afford molded products having good surface smoothness. By contrast, the excessively thin release layer (Samples Nos. 4 and 9 in Referential Example) is poor in releasability, and the excessively thick release layer (Samples Nos. 8 and 13 in Referential Example) give molded products having slightly poor surface smoothness.

Example 10

A press-mold to make a disk measuring 96 mm in diameter and 1–2 mm in thickness was formed from glassy carbon. The resulting press-mold was polished under different conditions so that it has the surface roughness as shown in Table 30. The polished press-mold had its molding surface coated with amorphous carbon film (1000 nm thick) by sputtering in the same way as in Example 8. This press-mold was used to press-form oxynitride glass in the same way as in Example 1. The molded product was evaluated for surface smoothness according to the same criteria as in Example 1.

The thus obtained molded product was polished in the following way. After cleaning, the molded product was set on the holder of a polishing apparatus. The surface (to be polished) of the molded product was brought into contact with a polyurethane polisher. The polisher was run at a speed of 2 m/s under a pressure of 5000 Pa. A lubricant containing abrasive (diamond powder having a particle diameter of 0.5 μm) dispersed therein was supplied dropwise to the polishing surface at a flow rate of 5 g/min. The polishability of the molded product was evaluated in terms of the length of time required for the desired surface smoothness (with a maximum height of irregularities ($R_{max}$) smaller than 10 nm and a center line average roughness ($R_a$) smaller than 1 nm) to be achieved. Good polishability leads to the reduction of polishing cost. The sample was rated as ○ if polishing takes less than 30 seconds and as X if polishing takes more than 30 seconds. The results are shown in Table 30.

TABLE 30

| Sample No. | Surface roughness of press-mold | | Surface roughness of molded product | | Surface smoothness of molded product | Polishing time (s) | Reduction of polishing cost | Remarks |
|---|---|---|---|---|---|---|---|---|
| | Rmax (nm) | Ra (nm) | Rmax (nm) | Ra (nm) | | | | |
| 14 | 900 | 100 | 420 | 48 | ○ | 25 | ○ | Example |
| 15 | 1000 | 90 | 490 | 40 | ○ | 21 | ○ | Example |
| 16 | 1000 | 100 | 500 | 50 | ○ | 30 | ○ | Example |
| 17 | 1000 | 110 | 520 | 61 | X | 42 | X | Comparative Example |
| 18 | 1100 | 100 | 630 | 53 | X | 50 | X | Comparative Example |

It is apparent from Table 30 that the press-mold having a smooth surface gives the molded products (Samples Nos. 14 to 16) with good surface smoothness as indicated by the maximum height of irregularities ($R_{max}$) smaller than 500 nm and the center line average roughness ($R_a$) smaller than 50 nm. It was found that the molded products with such smooth surface permit the reduction of polishing cost.

EFFECT OF THE INVENTION

The method of the present invention makes it possible to produce disks of oxynitride glass efficiently by pressing under the controlled conditions (pressing temperature, pressing load, and pressing time) as specified by the expression (1). The molding conditions can be established according to the glass composition by varying the value of A. This means that disks of different composition can be press-molded in high yields.

According to this invention, pressing of oxynitride glass can be accomplished efficiently by using a press-mold made of glassy carbon or a press-mold provided with a release layer containing carbon and/or boron nitride having a particle diameter of 0.01–100 μm or a release layer of deposited film of amorphous carbon and/or amorphous carbon nitride.

The method of the present invention is suitable for the production of disks having a high specific rigidity. The disks of oxynitride glass are suitable for use as the substrate of recording medium such as magnetic disk.

What is claimed is:

1. A method of producing a disk having a radius of r and a thickness of 2h from an oxynitride glass by pressing method, wherein in the method the pressing load (F), the pressing temperature (T), and the pressing time (t) are defined by the expression below:

$$1900 \geq T \geq 100 \times \log_{10}\left(\frac{0.045 \times \pi \times r^4}{t \times h^2 \times F}\right) + A \quad (1)$$

where,
F: pressing load (N)
T: pressing temperature (° C.)
t: pressing time (s)
π: ratio of the circumference to its diameter
r: radius of disk formed by pressing (mm)
h: half a thickness of disk formed by pressing (mm)
A: constant depending on glass composition (° C.) defined by 1450° C.$\geq$A$\geq$650° C.

2. A method of pressing oxynitride glass as defined in claim 1, wherein said method employs a press-mold.

3. A method of pressing oxynitride glass as claimed in claim 2, wherein the press-mold is made of graphite.

4. A method of pressing oxynitride glass as claimed in claim 2, wherein the press-mold is made of glassy carbon.

5. A method of pressing oxynitride glass as defined in claim 1, wherein said pressing employs a press-mold which has a release layer between the press-mold and the oxynitride glass.

6. A method of pressing oxynitride glass as defined in claim 5, wherein the release layer contains carbon and/or boron nitride having an average particle diameter of 0.01–100 μm and the release layer has a thickness of 0.001–10 μm.

7. A method of pressing oxynitride glass as defined in claim 5, wherein the release layer is a deposited film of amorphous carbon and/or amorphous carbon nitride and the release layer has a thickness of 1–1000 nm.

* * * * *